Figure 1:
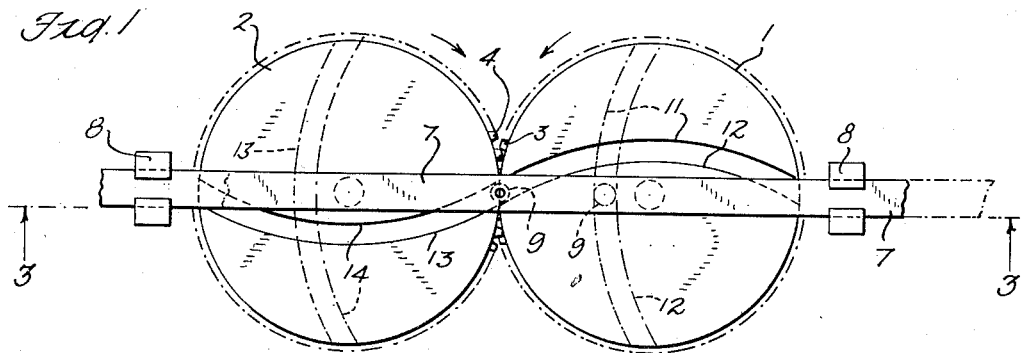

Nov. 6, 1928.　　　　　　　　　　　　　　　　　1,690,096
J. C. CONN

MECHANICAL MOVEMENT

Filed Dec. 8, 1926

INVENTOR
JOSEPH C. CONN
BY
*John W. Thompson*
ATTORNEY

Patented Nov. 6, 1928.

1,690,096

UNITED STATES PATENT OFFICE.

JOSEPH C. CONN, OF BOONTON, NEW JERSEY.

MECHANICAL MOVEMENT.

Application filed December 8, 1926. Serial No. 153,238.

The present invention relates to an improvement in mechanical movements, more particularly of the type in which rotary motion is translated into reciprocatory motion.

One object of this invention is to afford mechanism whereby cam controlled reciprocatory motion may be effected in such a manner as to avoid the shuddering or binding which frequently occurs in cam operated reciprocating devices co-incident with the reversals in direction of motion. A further object has been to provide a mechanical movement of the kind specified and in which the maximum power is available at or incident to reversal in direction of motion. Other advantages and objects attained will be apparent to those skilled in mechanical arts, although the inventive concept will be illustrated and described in the present application by reference to only a limited number of embodiments, as shown in the drawings in which Figure 1 is a front elevation, Figure 2 a rear elevation, Figure 3 a transverse section on line 3—3 of Figure 1, and Figure 4 a front elevation of a modification in which the reciprocatable member is a lever.

Figure 3:
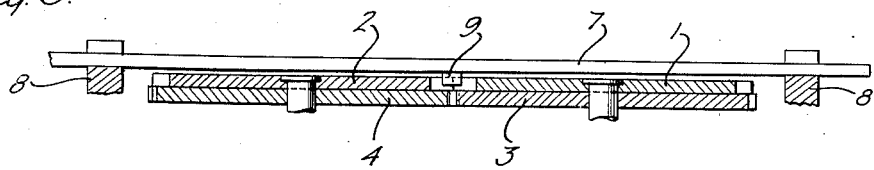
Figure 2:
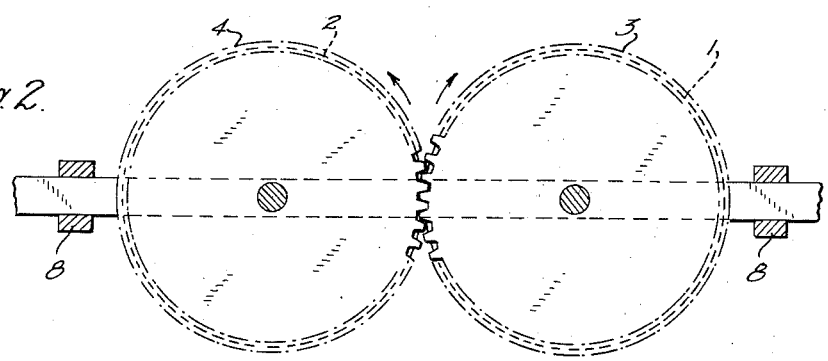

Referring to Figures 1 to 3 of the drawings, one embodiment of my invention is shown in which a pair of cams 1 and 2 are mounted for synchronized rotation with intermeshing gears 3 and 4 respectively, said gears being actuated by any suitable driving device, (not shown). A reciprocating member such, for example as a bar 7, which for the purpose of this description may represent any reciprocatable part, is slidably mounted between sets of guides 8. The cams 1 and 2 are provided with cam surfaces arranged to engage and move a cam follower such as a lug 9 secured to the reciprocatable bar 7 when the cams are rotated in opposite directions of rotation. When the cams are rotated in the direction indicated by arrows in Figure 1, the follower, or stud 9, will be pulled toward the axis of cam 1 by a cam surface portion 11 until said lug reaches the end position as shown in dotted lines in Figure 1, whereupon continued rotations of the cams will cause the stud 9 to be pushed away from the axis of cam 1 by a cam surface portion 12 until it reaches a position to be intercepted by a pulling portion 13 of cam 2. Thereafter it is again pushed toward cam 1 by the cam surface portion 14. The pulling in and pushing out of the cam follower by action of the appropriate cam surface portions is repeated periodically during rotation of the cams which are synchronized so that the follower is alternately shifted from one cam to the other. It will be apparent from Figure 1 that, as the reciprocatory member 7 reaches the end of its travel toward the right, the follower 9 is in effective engagement with those operative cam surfaces which are nearest the center of the cam. In the form of apparatus shown, the direction of operation of the cams may be reversed with similar effect.

Figure 4:
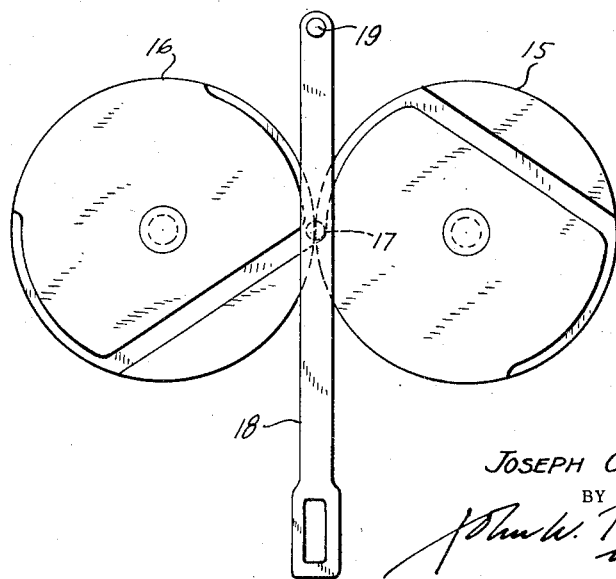

In the modification shown in Figure 4, cams 15 and 16 are mounted and driven substantially as shown in Figures 1–3, or in any other suitable manner. However, the cam surfaces are of different contour, being in this instance of a form which permits the follower 17 to pause in its reciprocatory movement midway between the extremes of its course. It will be apparent that the duration of the pause or dwell may be varied by varying the length of the cam path over which the follower rides between the cams. It will also occur to those skilled in the art that a hitch movement may be effected either during the dwell or at any other desired position of the follower's path by providing therein a suitable deformation. Figure 4 also shows a reciprocatable member in the form of a lever 18 pivoted at 19 and which carries the follower 17. Obviously the lever can be used as advantageously with cams of the form shown in Figure 1 as with those shown in Figure 4.

It is contemplated that the mechanical movement hereinabove described will be capable of a wide variety of application to machines and apparatus in which a to and fro movement is indicated.

I claim as my invention:

1. A mechanical movement comprising a pair of cams having their axes parallel, means for rotating said cams in synchronous relation, and a cam follower movable between the axes of said respective cams and operatively engaging cam surfaces of both cams in succession during each movement in one direction between said axes.

2. A mechanical movement comprising a pair of cams, means for rotating said cams in synchronized relation, and a cam follower mounted for reciprocation and positioned to operatively engage cam surfaces of one of said cams in both directions of movements through a portion of its course and to engage cam surfaces of the other of said cams in both directions of movements during another portion of its course.

3. A mechanical movement comprising a pair of rotatable cams, a reciprocatory cam follower, a cam surface on one of said cams for periodically moving the follower in one direction toward and into operative engagement with the other cam, and a cam surface of said other cam for engaging and moving the follower in the same direction.

4. A mechanical movement comprising a pair of rotatable cams, a reciprocatory cam follower and a cam surface on each cam for periodically moving the follower toward and away from the center of rotation of the cam.

5. A mechanical movement comprising a pair of rotatable cams, a reciprocatable member, and means interposed between said cams and said member and slidably engaging cam surfaces of said cams whereby rotation of each cam effects to and fro motion of said reciprocatable member.

6. A mechanical movement comprising a cam follower and a pair of rotatable cams each provided with cam surfaces end portions of which constitute follower pulling and follower pushing portions respectively, and means for synchronizing rotation of said cams whereby a follower pulling portion of one cam is periodically disposed in follower receiving relation to a follower pushing portion of said other cam.

7. A mechanical movement comprising a cam follower, a pair of cam members arranged with their central axes in parallel spaced relation, each member being provided with cam surfaces, one of said surfaces of one cam member being adapted to move the follower in a direction away from the other cam member and the other of said surfaces being adapted to move the follower in a direction toward said other cam member, and means for rotating said cam members in synchronized relation.

8. A mechanical movement comprising a cam follower, a pair of cam members mounted for rotation in opposite directions and each provided with a cam surface adapted to move the follower toward the other member and a cam surface adapted to move the follower away from said other member, and means for rotating said cam members in synchronized relation.

9. A mechanical movement comprising a cam follower and cam members mounted for rotation in opposite directions and each provided with a follower pulling cam surface and a follower pushing cam surface spaced from said follower pulling surface and overlapping a portion thereof.

10. A mechanical movement comprising a cam follower and rotatable cam members each provided with a follower pulling cam surface and a follower pushing cam surface spaced from said follower pulling surface and overlapping a portion thereof, and said follower pushing cam surface being interrupted to permit a dwell at an intermediate portion of the movement of said follower.

In testimony whereof, I have signed my name to this specification this sixth day of December, 1926.

JOSEPH C. CONN.